Figure 1:
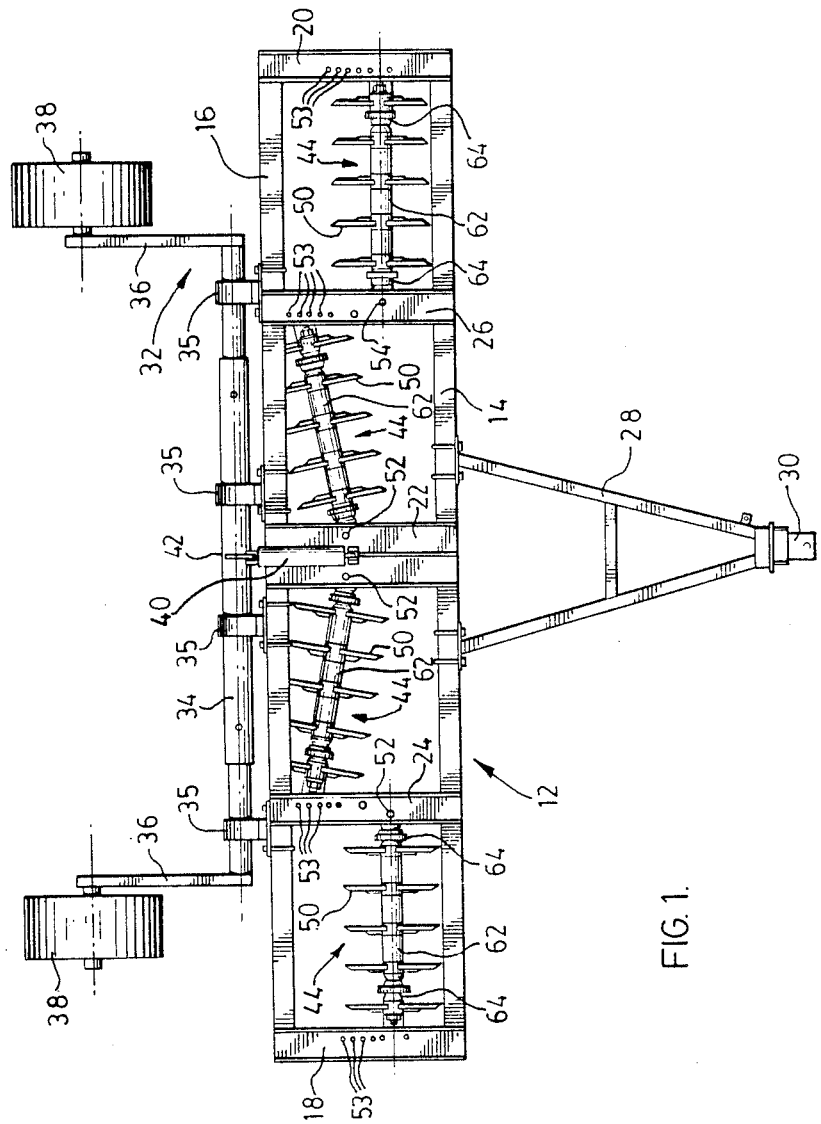

United States Patent [19]

Mayer

[11] Patent Number: 4,840,232

[45] Date of Patent: Jun. 20, 1989

[54] SOIL AERATING EQUIPMENT

[75] Inventor: Matthew E. Mayer, Woodstock, Canada

[73] Assignee: Holland Equipment Limited, Woodstock, Canada

[21] Appl. No.: 159,158

[22] Filed: Feb. 23, 1988

[51] Int. Cl.$^4$ .............................................. A01B 45/02
[52] U.S. Cl. ........................................ 172/21; 172/548
[58] Field of Search ................... 172/549, 548, 21, 22, 172/554, 123, 540, 550, 556

[56] References Cited

U.S. PATENT DOCUMENTS

| 396,374 | 1/1889 | Sherman | 172/556 X |
| 1,123,613 | 1/1915 | Stevenson | 172/549 |
| 1,812,708 | 6/1931 | Nygard | 172/549 |
| 1,858,948 | 5/1932 | Bird | 172/554 |
| 2,574,772 | 11/1951 | Zorn | 172/549 |
| 4,383,580 | 5/1983 | Huxford | 172/21 |

FOREIGN PATENT DOCUMENTS

| 1083974 | 6/1954 | France | 172/549 |
| 37372 | 10/1934 | Sweden | 172/548 |

OTHER PUBLICATIONS

Aer Way Advertising brochure of Holland Equipment, Melton, Victoria Australia 1980.

Primary Examiner—Richard J. Johnson
Attorney, Agent, or Firm—Robert F. Delbridge; Arne I. Fors

[57] ABSTRACT

Soil aerating equipment has a frame moveable in an intended direction of travel, and at least a pair of shafts freely rotatably mounted on the frame for rotation about the shaft longitudinal axes. The shafts extending in rearwardly inclined opposite directions on opposite sides of a centre line of the frame extending in the direction of travel. The rearward inclination of the shafts is adjustable to desired angles in the range of from about 90° to about 120° to the direction of travel. Each shaft carries a series of soil-engaging substantially planar tines extending therefrom in vertical planes and positioned to sequentially engage and penetrate the soil with consequent rotation of the shafts when the frame is moved in the direction of travel. Each tine has a central longitudinal axis which extends behind the shaft rotational axis at a distance therefrom in the range from about 0.25 to about 1.75 inches, and each tine is twisted about the tine central longitudinal axis at an angle to a vertical plane parallel to the direction of travel in the range of from about 1° to about 30°.

4 Claims, 5 Drawing Sheets

SOIL AERATING EQUIPMENT

This invention relates to soil aerating equipment.

It is of course well known that soil needs to be aerated (i.e. decompacted) from time to time to encourage growth of a crop (including grass) by facilitating the access of air, moisture and nutrients to its roots and by providing space for the roots to grow. With relatively large areas, it is usual to effect aeration by means of tractor-towed aerating equipment. In practice, different types of areas require different kinds of aeration. For example, it may be necessary to regularly aerate sub-soil without significantly disturbing the surface, for example in the case of a grass-covered fairway of a golf course. Alternatively, it may be necessary to aerate an area with highly compacted soil, for example a grass covered pasture where animals have grazed and have compacted the soil or an area which has not been aerated for a considerable length of time. In such cases, it is also usually necessary not to significantly disturb the surface. In another situation, it may be desired not only to aerate sub-soil but also to turn over the surface.

In the past, it has usually been necessary to use different types of aerating equipment to effect aeration in different kinds of situations as mentioned above. For example, U.S. Pat. No. 4,383,580 (Huxford) issued May 17, 1983 describes an aerating implement which is especially useful for aerating soil in pastures where it is necessary not to unduly disturb the surface. The Huxford patent teaches an aerating implement with a plurality of shafts rotatably mounted on a frame with their axes at an angle in the range of 70°–90° to the direction of travel, a plurality of substantially planar ground cutting and penetrating members mounted on the shafts with the plane of each cutting member at an angle of 70°–90° to the axis of its shaft towards it outer end.

An aerating implement in accordance with the Huxford patent operates to aerate sub-soil without significantly disturbing the surface, and is thus useful in aerating areas where this type of operation is required. Since issue of the Huxford patent, operation of the Huxford aerating implement has been improved by re-orienting the cutting members such that the longitudinal centre line of each cutting member does not pass through the axis of rotation of the shaft as shown in the Huxford patent, but is shifted rearwardly relative to the direction of movement of the shaft so that the longitudinal centre line of each cutting member is rearwardly spaced from the axis of rotation of the shaft, and also by twisting each cutting member by a small angle about its longitudinal centre line.

However, an aerating implement in accordance with the teaching in the Huxford patent is not suitable for use in situations where it is desired to aerate the sub-soil and also turn over the surface. Another type of aerating implement thus has to be used in such situations, therefore requiring the availability of two different types of aerating implement.

It is therefore an object of the present invention to provide an aerating implement which is adjustable to enable both aeration without substantially disturbing the surface and aeration with turnover of the surface to be effected.

According to the invention, soil aerating equipment comprises a frame moveable in an intended direction of travel, at least soil aerating equipment comprising a frame moveable in an intended direction of travel, at least a pair of shafts freely rotatably mounted on the frame for rotation about the shaft longitudinal axis, said shafts extending in rearwardly inclined opposite directions on opposite sides of a centre line of said frame extending in the direction of travel, means for adjusting the rearward inclination of the shafts to desired angles in the range of from about 90° to about 120° to the direction of travel, each shaft carrying a series of soil-engaging substantially planar tines extending therefrom in vertical planes and positioned to sequentially engage and penetrate the soil with consequent rotation of the shafts when the frame is moved in the direction of travel, each tine having a central longitudinal axis which extends behind the shaft rotational axis at a distance therefrom in the range from about 0.25 to about 1.75 inches, and each tine being twisted about the tine central longitudinal axis at an angle to a vertical plane parallel to the direction of travel in the range of from about 1° to about 30°.

It as been found that soil aeration without significantly disturbing the surface can be effected by positioning the shafts at an angle to the direction of travel in the lower part of the angular range as specified, and that soil aeration with surface turnover can be effected by positioning the shafts at an angle to the direction of travel in the upper part of the specified angular range. An operator can thus utilise the same item of equipment for both purposes, thereby saving not only the cost of having to provide another item of equipment but also saving time because aeration equipment in accordance with the invention can readily be adjusted for use in one situation or the other. Thus, an operator does not have to return from a work area to another place to change equipment.

The present invention is also particularly advantageous, compared to the teaching of the Huxford patent, because in practice there is usually a greater need for aeration with surface turnover than for aeration without significant surface disturbance. Further, when aerating equipment in accordance with the invention is towed, the rear inclination of the shafts provides more easy steering than with forwardly inclined shafts as taught by the Huxford patent.

Each tine may have a pointed end from which a first ground engaging edge extends, when the tine is in a vertical downwardly-extending position, in an upwardly and rearwardly inclined direction at an angle to the vertical in the range of from about 1° to about 30° and from which a second edge extends in a vertical direction.

The first inclined edge of each tine may be bevelled on one side of the tine, with the second vertical edge being bevelled on the opposite side of the tine.

The tines may be mounted on each shaft in longitudinally spaced sets each provided by a tine assembly, each tine assembly consisting of an integral casting comprising a hollow hub mounted on the shaft for rotation therewith and a series of equally-angularly spaced tines integral with and extending from the hub.

Figure 2:
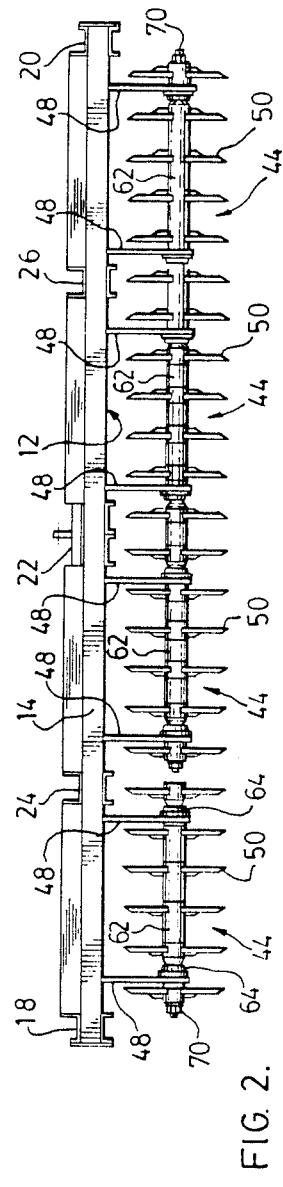
Figure 3:
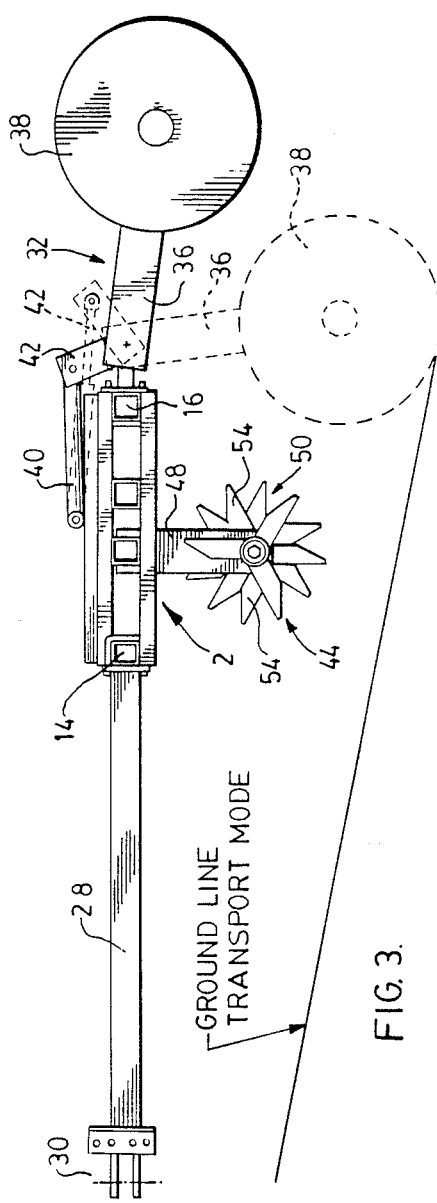
Figure 4:
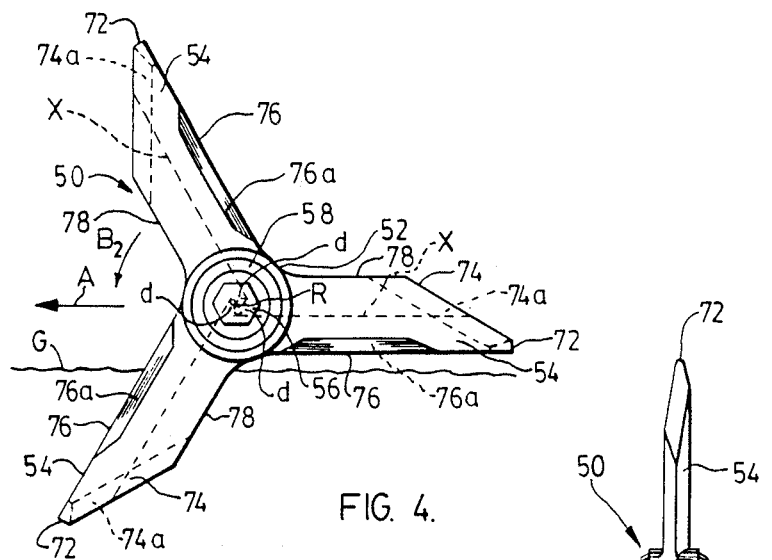
Figure 5:
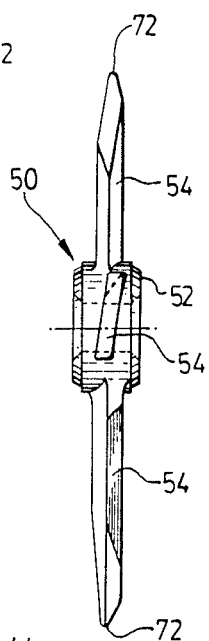
Figure 6:
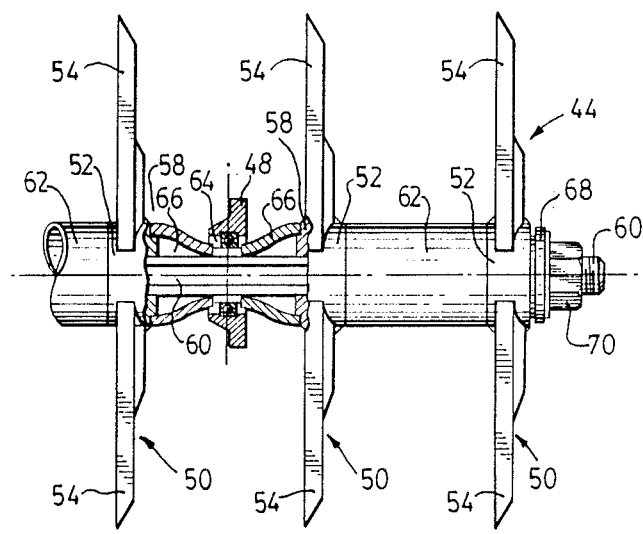
Figure 7:
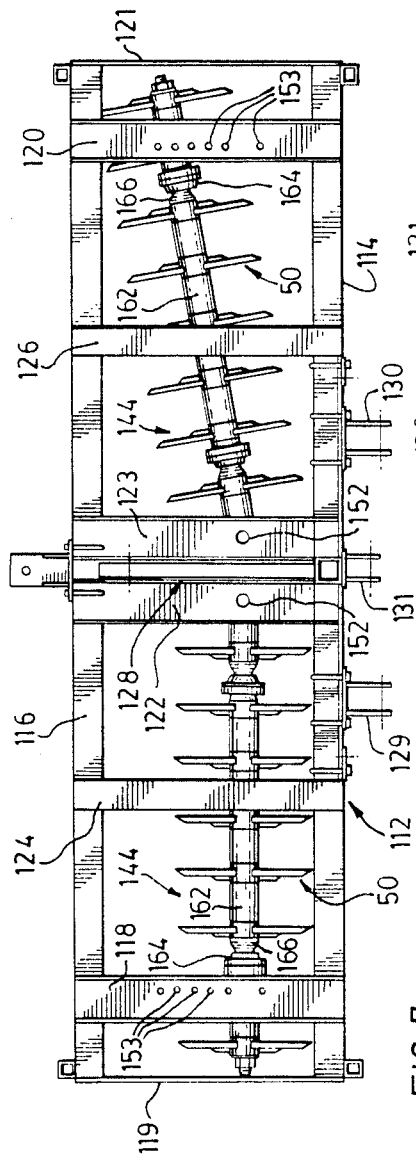
Figure 8:
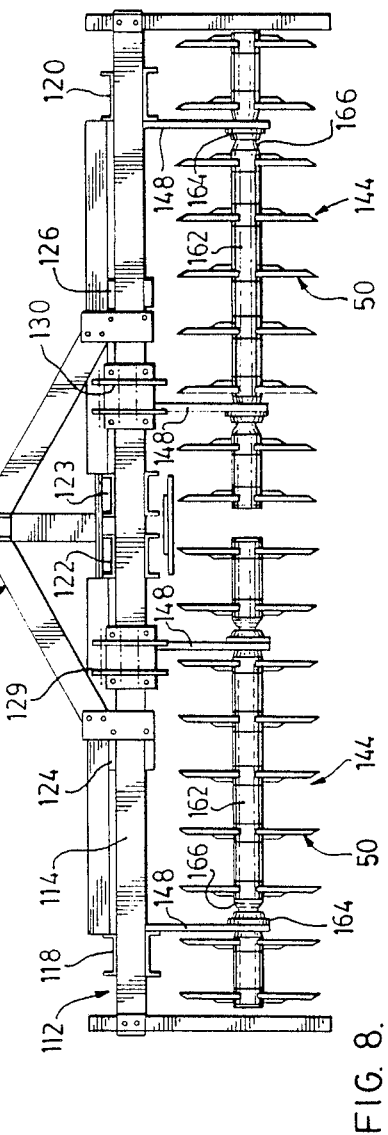
Figure 9:
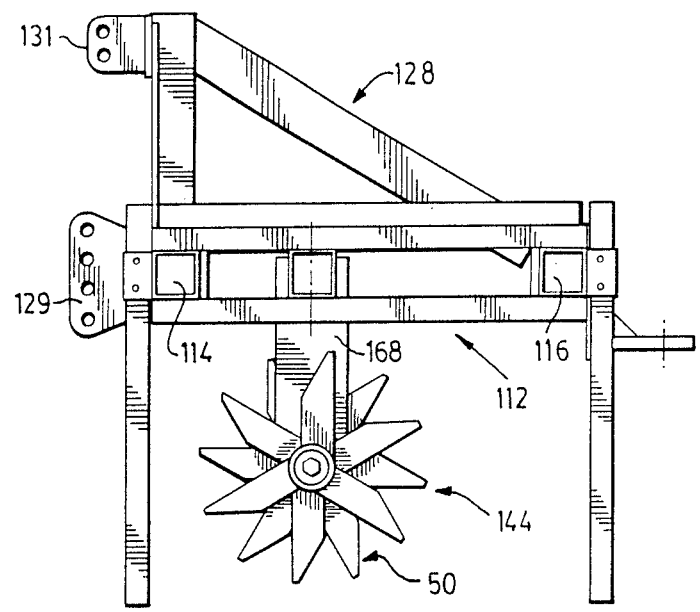

Embodiments of the present invention will now be described, by way of example, with reference to the accompanying drawings of which:

FIG. 1 is a diagrammatic plan view of soil aerating equipment in accordance with one embodiment of the invention, FIG. 2 is a front view thereof (with the hitch and wheel assemlby omitted for clarity), FIG. 3 is a side front view thereof, FIG. 4 is a side view of one of the tine assemblies, FIG. 5 is a rear view of the tine assembly, FIG. 6 is a front view, partly in section, showing the tine assemblies mounted on a shaft, FIG. 7 is a diagrammatic plan view of a second embodiment of the invention, FIG. 8 is a front view thereof, and FIG. 9 is a side view thereof.

Referring first to FIGS. 1 to 6, soil aerating equipment in accordance with a first embodiment of the invention comprises a frame 12 which has a front member 14, a rear member 16, side members 18, 20, central member 22 and intermediate members 24, 26. The various frame members are secured together by welding in a manner which will be readily apparent to a person skilled in the art. A hitch assembly 28 is rigidly secured to and extends forwardly from the front member frame 14, and has a conventional coupling 30 at its forward end for attachment to a tractor or other towing vehicle.

A wheel assembly 32 is mounted at the rear of the frame 12 and comprises a shaft 34 extending along the rear of the rear frame member 16 and rotatably mounted in brackets 35 secured to the rear frame member 16. Two legs 36 extend from opposite ends of the shaft 34 and carry rotatably mounted wheels 38. A hydraulic cylinder 40 is pivotally connected between the central frame member 22 and lug 40 secured to the shaft 34 so that, by rotation of the shaft 34 by operation of the hydraulic cylinder 40, the wheels 38 can be moved between a lower ground engaging position shown in dotted outlines in FIG. 3 and a retracted position shown in full lines. The hydraulic cylinder 40 is suitably connected to hydraulic power provided by the towing vehicle in a manner which will be readily apparent to a person skilled in the art.

Four tine gangs 44 are suspended from the frame 12 by pairs of legs 48. Two of the tine gangs 44 are inner gangs, one inner gang 44 being suspended from the centre frame member 22 and the intermediate frame member 24, and the other inner gang 44 being suspended from the centre frame member 22 and the intermediate frame member 26. The other two gangs 44 are outer gangs, one outer gang 44 being suspended from the intermediate frame member 44 and the side frame member 18, and the other outer gang 44 being suspended from the intermediate frame member 26 and the outer frame member 20.

Each gang 44 has six tine assemblies 50. As shown most clearly in FIG. 2, the lower ends of the gang suspending legs 48 are connected to the respective tine gang 44 between the first and second tine assemblies 50 from each end. The inboard leg 48 of each gang 44 is pivotally connected to an adjacent frame member by a vertical swivel pin 51. The outboard leg 48 is connectible by a vertical swivel pin (not shown) at any one of a series of positions 54 to an adjacent frame member. Thus, by adjusting the location of the swivel pin at the outboard end of a tine gang 44, the angle between the longitudinal axis of the gang 44 and the direction of travel of the aerating equipment can be adjusted between 95° as indicated by way of example in FIG. 1 with the two outer gangs 44, and 120° as indicated with the two inner gangs 44. Such angular adjustment can be very quickly effected.

Referring now more particularly to FIGS. 4 to 6, each tine assembly 50 is a metal casting with a hub 52 from which three tines 54 extend in equally-angularly spaced relationship, i.e. at an angle of 120° between adjacent tines 54. The hub 52 has a central aperture 56 of hexagonal shape and an annular projection 58 on each side. Each tine gang 44 comprises a shaft 60 with a hexagonal section on which the tine assemblies 50 are mounted, with the tine assemblies 50 being keyed to the shaft 60 for rotation therewith by the hexagonal shape of the exterior of the shaft 60 and the interior of the hub apertures 56. The intermediate tine assemblies 50 are spaced from each other by annular spacers 62 which fit at opposite ends over the annular projections 58 of adjacent tine assemblies 50.

A bearing 64 carried by the lower end of suspension leg 48 is mounted on the shaft 60 between the first and second tine assemblies 50 from each end. An adjacent tine assembly 50 is spaced from the bearing 64 by shorter shaped spacers 66 which engage the annular projection 58 of the tine hub 52 at one end and the bearing 64 at the other end. These components are retained in assembly on the shaft 60 by washers 68 and nuts 70 on threaded shaft ends.

Each tine 54 is in the form of a planar blade extending in a vertical plane from the hub 52 and having a pointed end 72. A first ground engaging edge 74 extends, when the tine 54 is in a vertical downwardly extending position, in an upwardly and rearwardly inclined direction. A second edge 76 extends from the pointed end 72 to the hub 52 in a vertical direction, and a third edge 78 extends from the end of the first edge 74. The first edge 74 is bevelled at 74a over the whole of its length, and the second edge 76 is bevelled at 76a over a major part of its length extending from the hub 52, the bevelling of the first edge 74 being on the opposite side of tine 54 to the bevelling of second edge 76.

Each tine 54 has a central longitudinal axis X midway between and parallel to the edges 76, 78 which extend behind the rotational axis of the shaft 60 (indicated at R in FIG. 4), being spaced therefrom by distance which in this embodiment is 0.625 inches. As shown especially in FIG. 5, each tine 54 is twisted about its central axis X by 8° from the vertical plane parallel to the direction of travel, the axis X being perpendicular to the longitudinal axis of the shaft 60.

In use, the aerating equipment is hitched to a tractor by means of the hitch coupling 30. For movement from one site to another, the aerating equipment is towed on the wheels 58, i.e. in the lower most position shown in dotted outline in FIG. 3 with the hydraulic cylinder 40 in the extended position. To aerate a desired area, the cylinder 40 is retracted to raise the wheels 38 to the upper most position shown in full lines in FIG. 3 so that the lower most tines 54 of the tine assemblies 50 engage and dig into the ground under the weight of the aerating equipment. It is desirable that each tine 54 digs into the ground for its full length when in the lower most vertical position. If the ground is especially hard, extra weight may have to be placed in known manner on the frame 12.

If aeration without significant surface disturbance is required, the tine gangs 44 are positioned at an angle of 95° to the direction of travel, this being the position shown for the two outer most gangs in FIG. 1. If aeration and turnover of the top surface is desired, the tine gangs 44 are positioned at an angle of 120° to the direction of travel as shown for the two inner most gangs in FIG. 1. Angular positions between these limits can be used to effect aeration with varying amounts of surface disturbance.

The digging into the ground of the tines 54 of a tine gang 44 causes the gang shaft 60 to rotate as the tractor (not shown) pulls the aerating equipment in the direction of travel, there being a sufficient number of angularly spaced tines 54 in each tine gang 44 to ensure that there is always one tine 54 digging into the ground. This is clearly shown in FIG. 3, with there being six tine assemblies 50, each with three tines 54 in each tine gang 44 in this embodiment. In other words, each tine gang 44 has eighteen equi-angularly based tines 54.

Referring more particularly to FIG. 4, and assuming travel in the direction of arrow A, each tine assembly 50 rotates in an anti-clockwise sense indicated by arrow B as it travels in direction A. In FIG. 4, the surface of the ground is shown by line G. Thus, each tine 54 engages the ground G first at its lower bevelled edge 74 and then at its edge 78 to in effect slice through the sub-soil. The offset of the centre line X of the tine 54 in conjunction with the rearward inclination of the tine gang 44 relative to the direction of travel and with the 8° twist of the tine 54 about its centre line X causes the tine 54 to sufficiently disturb the subsoil to effect adequate aeration, whatever the rearward inclination of the tine gang 44 within the angular range of the present invention.

If the rearward inclination of the tine gang 44 is at or near the lower angle of 95° to the direction of travel, each tine 54 leaves the ground in a manner to cause minimal disturbance to the surface, with this effect being assisted by the bevelling of edge 76 of the tine 54. If the rearward inclination of the gang 44 is at or near the higher angle of 120° to the direction of travel, the result is to cause the tines 54 to turn over the surface as they leave the ground.

The embodiment shown in FIGS. 7 to 9 is smaller aerating equipment compared to the first embodiment and is arranged to be raised and lowered by means of a hydraulically-operated three point tractor hitch of known kind. The aerating equipment has a frame 112 with a front member 114, a rear member 116, side members 118, 120, two side-by-side centre members 122, 123, intermediate members 124, 126 and end guards 119, 121. A three point hitch assembly 128 is secured to the frame 112 and comprises two lower couplings 129, 130 and an upper coupling 131.

Two tine gangs 144 are provided, each gang 144 being similar in construction to the gangs 44 of the previous embodiment, except that each gang 144 has nine tine assemblies 50 instead of six as in the previous embodiment. Each gang 144 is suspended from the frame 122 by pairs of legs 148. One gang 144 is suspended from centre member 122 and side member 118, and the other gang 144 suspended from centre member 123 and side member 120. In this embodiment, the lower end of legs 148 are connected to each gang 144 between the second and third tine assemblies 50 from each end. The inner leg 148 of each gang 144 is connected to a centre member 122 or 123 respectively by a swivel pin 151. The outer most leg 148 is connected by a swivel pin (not shown) at any one of a series of positions 153 to the side member 118 or 120 respectively. Each tine assembly 150 is spaced from an adjacent tine assembly by an annular spacer 162 and from a leg bearing 164 by a shorter spacer 166.

The operation of this embodiment is essentially the same as that of the previous embodiment, with the aerating equipment shown in FIGS. 7 to 9 being movable between inoperative and operative positions by operation of the three point hitch as will be readily apparent to a person skilled in the art.

Other embodiments of the invention will also be readily apparent to a person skilled in the art, the scope of the invention being defined in the appended claims.

I claim:

1. Soil aerating equipment comprising a frame moveable in an intended direction of travel, at least a pair of shafts freely rotatably mounted on the frame for rotation about the shaft longitudinal axes, said shafts extending in rearwardly inclined opposite directions on opposite sides of a centre line of said frame extending in the direction of travel, means for adjusting the rearward inclination of the shafts to desired angles in the range of from about 90° to about 120° to the direction of travel, each shaft carrying a series of soil-engaging substantially planar tines extending therefrom in vertical planes and positioned to sequentially engage and penetrate the soil with consequent rotation of the shafts when the frame is moved in the direction of travel, each tine having a central longitudinal axis which extends behind the shaft rotational axis at a distance therefrom in the range from about 0.25 to about 1.75 inches and each tine being twisted about the tine central longitudinal axis at an angle to a vertical plane parallel to the direction of travel in the range of from about 1° to about 30°.

2. Soil aerating equipment according to claim 1 wherein each tine has a pointed end from which a first ground engaging edge extends, when the tine is in a vertical downwardly-extending position, in an upwardly and rearwardly inclined direction at an angle to the vertical in the range of from about 1° to about 30° and from which a second edge extends in a vertical direction.

3. Soil aerating equipment according to claim 2 wherein the first inclined edge of each tine is bevelled on one side of the tine and the second vertical edge is bevelled on the opposite side of the tine.

4. Soil aerating equipment according to claim 1 wherein the tines are mounted on each shaft in longitudinally spaced sets, each provided by a tine assembly, each tine assembly consisting of an integral casting comprising a hollow hub mounted on the shaft for rotation therewith and a series of equally-angularly spaced tines integral with and extending from the hub.

* * * * *